US008321956B2

(12) United States Patent
Sadovsky et al.

(10) Patent No.: US 8,321,956 B2
(45) Date of Patent: Nov. 27, 2012

(54) REMOTE ACCESS CONTROL OF STORAGE DEVICES

(75) Inventors: Vladimir Sadovsky, Redmond, WA (US); Sompong Paul Olarig, Pleasanton, CA (US); Chris Lionetti, Duvall, WA (US); James Robert Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 12/486,738

(22) Filed: Jun. 17, 2009

(65) Prior Publication Data
US 2010/0325736 A1 Dec. 23, 2010

(51) Int. Cl.
G06F 7/04 (2006.01)
G06F 17/30 (2006.01)
H04N 7/16 (2006.01)
(52) U.S. Cl. .......... 726/27; 726/2; 726/28; 726/29; 726/30; 705/13; 705/18; 713/182
(58) Field of Classification Search ............. 726/27, 726/2, 28, 29, 30; 705/13, 18; 713/182
See application file for complete search history.

(56) References Cited

U.S. PATENT DOCUMENTS

| | | | |
|---|---|---|---|
| 5,857,020 A * | 1/1999 | Peterson, Jr. .................... 705/52 |
| 6,067,620 A * | 5/2000 | Holden et al. ................. 713/155 |
| 6,351,813 B1 | 2/2002 | Mooney et al. |
| 6,434,700 B1 * | 8/2002 | Alonso et al. ................. 713/169 |
| 6,813,709 B1 | 11/2004 | Benardeau |
| 6,963,890 B2 | 11/2005 | Dutta |
| 6,970,817 B2 | 11/2005 | Ross et al. |
| 6,993,618 B2 | 1/2006 | Chen et al. |
| 7,200,756 B2 | 4/2007 | Griffin et al. |
| 7,375,615 B2 * | 5/2008 | Kitagawa et al. ............ 340/5.81 |
| 7,418,344 B2 | 8/2008 | Holtzman et al. |
| 7,516,484 B1 * | 4/2009 | Arnouse ........................... 726/9 |
| 7,633,375 B2 * | 12/2009 | Matsuda et al. ............. 340/5.74 |
| 7,706,778 B2 * | 4/2010 | Lowe ............................ 455/411 |
| 7,770,018 B2 * | 8/2010 | Fiske ............................ 713/182 |
| 7,886,347 B2 | 2/2011 | Gill et al. |

(Continued)

FOREIGN PATENT DOCUMENTS
EP 1551149 A2 7/2005
(Continued)

OTHER PUBLICATIONS

"Forezza Crypto Card Frequently Asked Questions", www.spyrus.com, all pages, Nov. 17, 2006. http://web.archive.org/web/20061117145614/http://www.spyrus.com/support/fortezza_faq.asp.*

(Continued)

Primary Examiner — James A Reagan
Assistant Examiner — Calvin Cheung

(57) ABSTRACT

An access control device can be communicationally coupled to a storage device and can control access thereto. The access control device can comprise information, such as identities of authorized entities, to enable the access control device to independently determine whether to provide access to an associated storage device. Alternatively, the access control device can comprise information to establish a secure connection to an authorization computing device and the access control device can implement the decisions of the authorization computing device. The access control device can control access by instructing a storage device to execute specific firmware instructions to prevent meaningful responses to data storage related requests. The access control device can also comprise storage-related cryptographic information utilized by the storage device to encrypt and decrypt data. In such a case, the access control device can control access by not releasing the storage-related cryptographic information to the storage device.

11 Claims, 7 Drawing Sheets

U.S. PATENT DOCUMENTS

| | | | |
|---|---|---|---|
| 7,987,372 B2 * | 7/2011 | Mani | 713/185 |
| 8,112,632 B2 * | 2/2012 | Bedingfield, Sr. | 713/186 |
| 8,116,455 B1 | 2/2012 | Sussland et al. | |
| 2002/0133713 A1 | 9/2002 | Fieschi et al. | |
| 2002/0152392 A1 | 10/2002 | Hardy et al. | |
| 2003/0046568 A1 | 3/2003 | Riddick et al. | |
| 2003/0056096 A1 * | 3/2003 | Albert et al. | 713/168 |
| 2003/0065919 A1 * | 4/2003 | Albert et al. | 713/168 |
| 2003/0117433 A1 * | 6/2003 | Milton et al. | 345/738 |
| 2003/0167376 A1 | 9/2003 | Koh | |
| 2004/0193764 A1 * | 9/2004 | Watanabe | 710/62 |
| 2004/0236952 A1 * | 11/2004 | Girouard et al. | 713/182 |
| 2005/0086493 A1 | 4/2005 | Ishidoshiro | |
| 2005/0228958 A1 | 10/2005 | Kawa et al. | |
| 2005/0237821 A1 | 10/2005 | Dekker et al. | |
| 2005/0244037 A1 | 11/2005 | Chiu et al. | |
| 2005/0268340 A1 | 12/2005 | Schilling | |
| 2006/0041934 A1 | 2/2006 | Hetzler | |
| 2006/0098405 A1 | 5/2006 | Bloebaum | |
| 2006/0123463 A1 | 6/2006 | Yeap et al. | |
| 2006/0174352 A1 | 8/2006 | Thibadeau | |
| 2006/0219776 A1 * | 10/2006 | Finn | 235/380 |
| 2006/0236115 A1 * | 10/2006 | Haneda | 713/182 |
| 2006/0242423 A1 * | 10/2006 | Kussmaul | 713/182 |
| 2006/0259785 A1 | 11/2006 | Thibadeau | |
| 2006/0288227 A1 * | 12/2006 | Kalofonos et al. | 713/182 |
| 2006/0294388 A1 * | 12/2006 | Abraham et al. | 713/182 |
| 2006/0294585 A1 * | 12/2006 | Sadovsky et al. | 726/17 |
| 2007/0045417 A1 | 3/2007 | Tsai et al. | |
| 2007/0214187 A1 | 9/2007 | Thomas et al. | |
| 2007/0234215 A1 | 10/2007 | Graham et al. | |
| 2007/0266258 A1 | 11/2007 | Brown et al. | |
| 2008/0002372 A1 | 1/2008 | Kelso et al. | |
| 2008/0005353 A1 * | 1/2008 | Panabaker et al. | 709/238 |
| 2008/0046751 A1 | 2/2008 | Choi | |
| 2008/0072071 A1 | 3/2008 | Forehand et al. | |
| 2008/0114990 A1 | 5/2008 | Hilbert et al. | |
| 2008/0120726 A1 | 5/2008 | Tsunchiro et al. | |
| 2008/0155184 A1 | 6/2008 | Gorobets et al. | |
| 2008/0235520 A1 | 9/2008 | Becker et al. | |
| 2008/0263305 A1 | 10/2008 | Shu et al. | |

FOREIGN PATENT DOCUMENTS

| | | |
|---|---|---|
| KR | 100480998 B1 | 4/2005 |
| KR | 1020080071530 | 8/2008 |

OTHER PUBLICATIONS

"International Search Report", Mailed Date: Feb. 7, 2011, Application No. PCT/US2010/038776, Filed Date: Jun. 16, 2010, pp. 10. (MS# 325790.02).

Zhu, et al., "SNARE: A Strong Security Scheme for Network-Attached Storage", retrieved at <<http://www.ececs.uc.edu/~zhuy/paper_dir/snare_srds.pdf, pp. 10.

"HDS Universal Storage Platform with Encryption", retrieved at <<http://www.storagenewsletter.com/news/systems/hds-universal-storage-platform-encryption>>, Oct. 31, 2008, pp. 3.

Olarig, et al., "Hardware Encrypting Storage Device With Physically Separable Key Storage Device", U.S. Appl. No. 12/356,326, filed Jan. 20, 2009.

* cited by examiner

REMOTE ACCESS CONTROL OF STORAGE DEVICES

BACKGROUND

Increasingly, computing devices are being utilized to operate on, and store, data and information that is meant to be kept private. Such data and information can include governmental secrets, but more likely includes business and personal information that could be damaging to one or more individuals if such information was obtained by a malicious party or an adversarial party. As such, various security mechanisms have been implemented, both in association with the hardware of a computing device and in association with the software of a computing device. Examples of such hardware security mechanisms include peripherals designed to generate secure passwords based on biometric information, such as a fingerprint, and physical access barriers to a computing device, such as keyboard locks, communication port locks, and the like. Examples of security mechanisms associated with the software of a computing device include various encryption technologies and various access control technologies.

However, the protection of data stored on one or more computer-readable media often fails during activity that is not directly associated with a computing device at all. For example, the data stored on one or more computer-readable media can be, and has been, compromised when physical shipments of storage devices, such as hard disk drives, that comprise the computer-readable media have not been properly safeguarded and have, consequently, been lost or even stolen. Similarly, data stored on one or more computer-readable media can be, and has been, compromised when storage devices comprising the computer-readable media have failed to be accessed from the host and have been, therefore, discarded. Often such "failed" storage devices retain a significantly high percentage of the data stored on their computer-readable media in a form that can be retrieved and accessed by a computing device.

To enhance the protection of data stored on computer-readable media, especially if the storage device comprising such media were to become physically accessible to malicious or adversarial parties, "full volume" encryption methodologies were developed, whereby substantially all of the data stored on the computer-readable storage media of a storage device is stored in an encrypted form such that, even if a malicious or adversarial party were to gain physical control of such a storage device, they would be unlikely to decrypt the data absent an appropriate decryption key. To provide greater performance, the encryption of data being stored on storage devices can be performed by dedicated cryptographic hardware that is part of the storage device itself, rather than by burdening the one or more central processing units of the computing device storing and retrieving such data.

In addition to full-volume encryption methodologies, the physical destruction, in an appropriate manner, of the computer-readable storage media, or the whole storage device, on which sensitive data was stored can likewise enhance the protection and security of such data. For example, computer-readable storage media that may have stored data that is to be protected can be physically shredded or exposed to random, strong, magnetic fields, such that the data is either not physically consistent, or is not physically recoverable from the computer-readable media. Alternatively, rather than physically destroying a storage device, sensitive data stored on a computer-readable storage medium can be overwritten by a computing device multiple times in accordance with pre-defined secure erasure policies. Unfortunately, physical destruction of computer-readable storage media and storage devices can be both costly and time-consuming and, as efficiencies are sought to reduce the time and expense, short-cuts that may compromise the protection and destruction of data stored on such media may be employed, thereby undermining the physical destruction efforts. Adding further inefficiencies, various regulations, such as governmental security regulations, or privacy regulations, can impose additional burdens, such as the requirement that proper destruction of computer-readable storage media is both undertaken and documented in a particular manner.

In many usage scenarios, such as server environments or enterprise Information Technology (IT) environments, storage devices are often moved between hosts. In such environments, forms of access control enforcement can be useful. Unfortunately, provisioning storage devices with forms of access control may be complicated and can result in substantial additional hardware component, development, and subsequent troubleshooting costs.

SUMMARY

A storage device can be associated with a physical entity, referred to herein as an "access control device", that can be physically and communicationally separated from the rest of the storage device. In addition, computing devices can comprise computer-executable instructions that are capable of communicating with the access control device independently of the storage device.

In one embodiment, the access control device can be provisioned with cryptographic information that can be utilized by a hardware cryptographic system of the storage device to, either directly or indirectly, encrypt and decrypt data that is stored on the computer-readable media of the storage device. The access control device can be further provisioned such that it only selectively provides its cryptographic information to the hardware cryptographic system of the storage device, and thereby enables the storage device to provide selective access to the data stored thereon. As a result, even when the access control device is communicationally coupled to an associated storage device, the access control device can limit access to encrypted data stored on the storage device by only releasing its cryptographic information to the hardware cryptographic system of the storage device when predefined conditions are met.

In another embodiment, the access control device can be provisioned with a listing of entities, such as computing devices or users, that can be allowed to access the data stored on a storage device associated with the access control device. The access control device can then instruct the storage device associated with it to not meaningfully respond to data storage related communications from an entity that is not among the listed entities. Alternatively, or in addition, if the access control device was provisioned with cryptographic information, it can provide its cryptographic information to the hardware cryptographic system of the storage device, and thus allow the storage device to provide access to its stored data, only if the entity seeking to access the stored data is among the listed entities. The entity seeking access to the stored data can identify itself through user passwords, computing device identifiers, or other like information that can be provided in a secure context, such as within the context of a challenge/response authentication mechanism.

In a further embodiment, the access control device can be provisioned with cryptographic information that can enable it to establish a secure communication tunnel with an authorization computing device. The computing device seeking to access data stored on a storage device associated with the access control device can be utilized to enable the access control device to communicate with the authorization computing device through the secure tunnel. The access control device can then provide relevant information to the authorization computing device and can enable or instruct the storage device with which it is associated to provide data to a requesting device, only if the authorization computing device indicates that such action is appropriate.

In a still further embodiment, the access control device can be provisioned with executable instructions that can enable the access control device to update itself or be customized to provide customer-specific access control logic and algorithms. Such a set of executable instructions, or "scriptlets", can be provided to the access control device during provisioning and can then be updated from an external computing device in a secure and reliable manner. The access control device can be provisioned such that it initializes itself separately, with reference to either or both space and time, than an associated storage device or computing device.

In a yet further embodiment, the access control device can be provisioned with executable instructions that can enable the access control device to erase the data stored on an associated storage device, or to erase any cryptographic information stored on the access control device and thereby render the data on an associated storage device, that was encrypted using such cryptographic information, unreadable and inaccessible. The access control device can activate such executable instructions based on its own determination, or based on instructions received remotely, such as from an authorization computing device.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
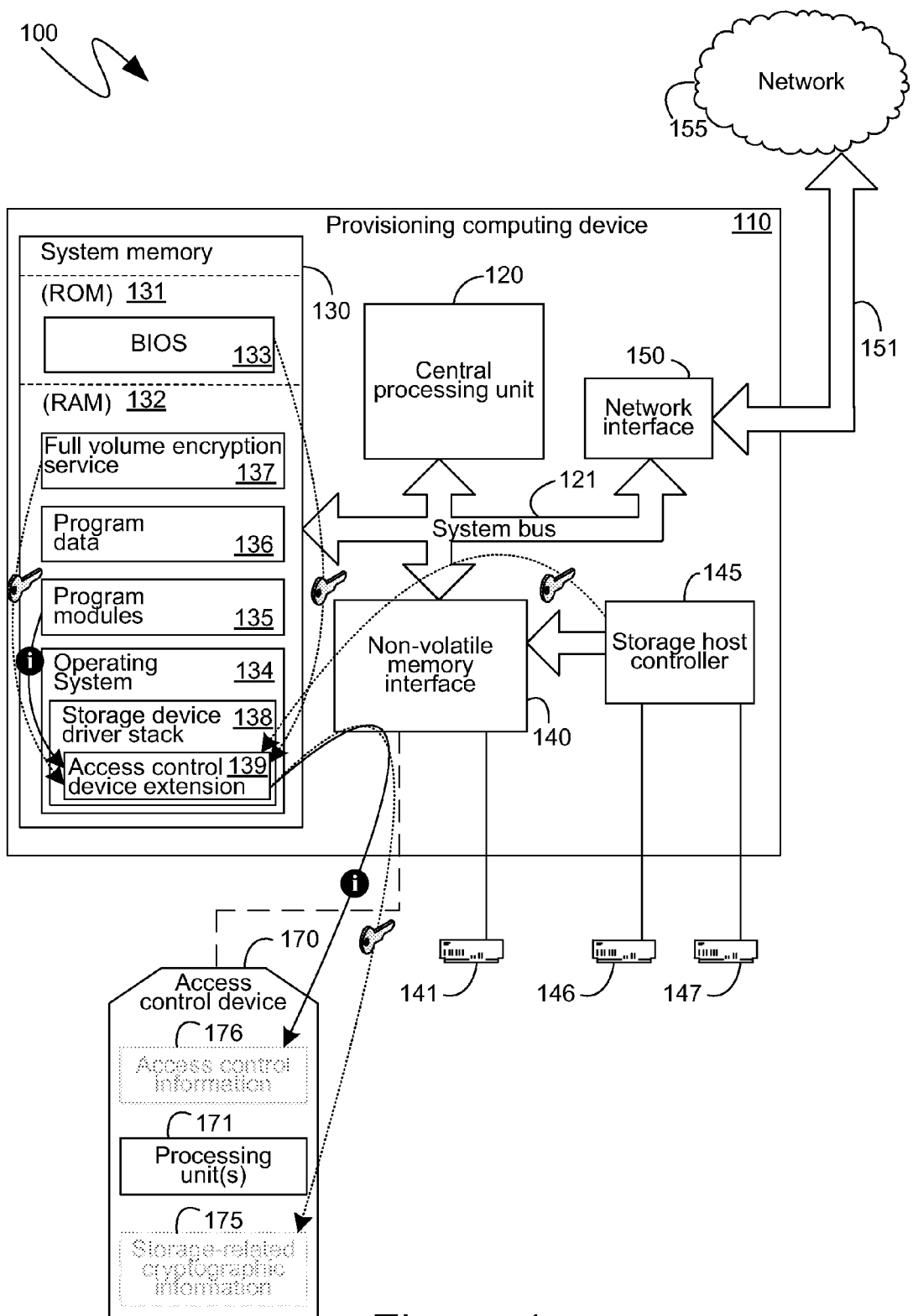
FIG. 1 is a block diagram of an exemplary provisioning computing device and an exemplary access control device.

The following description relates to storage systems that comprise a storage device and a physically and communicationally separable access control device, where the access control device contains access control information that can be utilized by the access control device to control when data stored on the storage device is made available to an entity seeking to access it. The access control device can prevent the storage device from communicating with unauthorized entities, such as by instructing it to not meaningfully respond to data storage related communications from such entities, including communications requesting data already stored on the storage device and communications requesting that provided data be stored on the storage device. The access control device can also comprise cryptographic information whose selective provision to a hardware cryptographic system of the storage device can control access to encrypted data stored on the storage device. Authorization can be provided by the access control device itself, such as by having the access control device compare the identity of the entity seeking access to a pre-provided list of approved entities, or it can be provided by an authorization computing device that can be communicationally coupled to the access control device, and provide authorization instructions to the access control device, by way of the accessing computing device.

The techniques described herein focus on, but are not limited to, a storage device and a physically and communicationally separable access control device. Indeed, the below described access control mechanisms can be equally implemented by discrete components within a single storage device that are not meant to be separable, although, in such a case, security advantages present when the access control device and the storage device are physically separated may not be present. Such security advantages, however, are independent of the security provided by the below described access control mechanisms and, as such, do not limit the applicability of the below described mechanisms to specific hardware configurations. Consequently, while the descriptions below make reference to storage devices that are associated with physically separable access control devices, the scope of the descriptions themselves is not intended to be so limited.

Additionally, although not required, the descriptions below will be in the general context of computer-executable instructions, such as program modules, being executed by one or more processing units. More specifically, the descriptions will reference acts and symbolic representations of operations that are performed by one or more processing units, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the processing units or peripherals connected thereto in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the processing units referenced need not be limited to conventional personal computing processing units, and include other processor configurations, including dedicated processors, specific-use processors, communications processors, bus processors, controllers and the like often found in peripherals, hand-held devices, multi-processor systems, microprocessor based or programmable consumer electronics. Similarly, the computing devices referenced in the below descriptions need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 comprising an exemplary provisioning computing device 110 and an exemplary access control device 170 is illustrated. As will be described, the provisioning computing device 110 can be utilized to provision the access control device 170, such as by providing information to the access control device that can enable the access control device to limit access to an associated storage device.

Turning first to the provisioning computing device 110, it can include, but is not limited to, one or more central processing units (CPUs) 120, a system memory 130 and a system bus 121 that couples various system components including the system memory 130 to the processing unit 120. The system bus 121 may be any of several types of bus structures including a memory bus or memory controller, a peripheral bus, and a local bus using any of a variety of bus or point-to-point architectures. Depending on the specific physical implementation, one or more of the CPUs 120 and the system memory 130 can be physically co-located, such as on a single chip. In such a case, some or all of the system bus 121 can be nothing more than silicon pathways within a single chip structure and its illustration in FIG. 1 can be strictly notational convenience for the purpose of illustration.

The provisioning computing device 110 also typically includes computer readable media, which can include any available media that can be accessed by a computing device, such as the provisioning computing device 110, and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state disks (SSDs) or other solid-state based storage devices, or any other medium which can be used to store the desired information and which can be accessed by a computing device, such as the provisioning computing device 110. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136. Also illustrated is a full volume encryption service 137 which can, in some embodiments, be part of the operating system 134. The full volume encryption service 137 can enable a computing device, such as the provisioning computing device 110, to provide for the encryption of substantially, or all, of the information stored on one or more computer-readable storage media, or on portions thereof, such as portions defined as individual volumes by the operating system 134 or other storage controller of the computing device.

The operating system 134 of the provisioning computing device 110, in addition to, optionally, comprising a full volume encryption service 137, can also comprise a storage device driver stack 138. The storage device driver stack 138 can comprise computer-readable instructions relevant to establishing and maintaining communications with one or more storage devices, such as those described below. In addition, the storage device driver stack 138 can comprise an access control device extension 139 that can comprise computer-executable instructions relevant to establishing and maintaining communications with an access control device, such as the access control device 170. The access control device extension 139 can be requested by, and loaded by, the storage device driver stack 138, if the storage device driver stack receives an indication that an access control device, such as the access control device 170, is communicationally coupled to the provisioning computing device 110. As will be described further below, an access control device, such as the access control device 170, can be communicationally coupled to a computing device, such as the provisioning computing device 110, either directly, such as through a wired or wireless communicational connection, or through another, intermediate, device, such as a storage device to which the access control device is communicationally coupled.

The provisioning computing device 110 may include storage devices in addition to those described, including removable/non-removable, volatile/nonvolatile computer storage devices. By way of example only, FIG. 1 illustrates hard disk storage devices 141, 146 and 147 that read from or write to non-removable, nonvolatile magnetic media. Other removable/non-removable, volatile/nonvolatile computer storage media that can be used with the exemplary computing device include, but are not limited to, magnetic tape cassettes, flash memory cards, solid state drives (SSDs) and other solid-state based storage devices, digital versatile disks, digital video tape, solid state RAM, solid state ROM, and the like. The hard disk storage devices 141, 146 and 147, or any of these other removable/non-removable, volatile/nonvolatile computer storage media, are typically connected, either directly or indirectly, to the system bus 121 through a memory interface such as interface 140. In the illustrated exemplary provisioning computing device 110 of FIG. 1, the hard disk storage device 141 is shown as being directly connected to the non-volatile memory interface 140, such as through a physical connection internal to the provisioning computing device 110, or an external connection exposed via a port, while the hard disk storage devices 146 and 147 are shown as being connected to a storage host controller 145, such as, for example, a Redundant Array of Inexpensive Devices (RAID) controller which can then, in turn, be connected to the interface 140, again such as through a connection physically internal to the computing device 100. The non-volatile memory interface 140 can be any non-volatile memory interface, including, but not limited to, a Universal Serial Bus (USB) interface, an interface conforming to any one or more of the IEEE1394 specifications, a Serial AT Attachment (SATA) interface, or other like interfaces.

The provisioning computing device 110 may operate in a networked environment using logical connections to one or more remote computing devices. For simplicity of illustration, the provisioning computing device 110 is shown in FIG. 1 to be connected to a network 155 that is not limited to any particular network or networking protocols. The logical connection depicted in FIG. 1 is a general network connection 151 that can be a local area network (LAN), a wide area network (WAN) or other network. The provisioning computing device 110 is connected to the general network connection 151 through a network interface or adapter 150 which is, in turn, connected to the system bus 121. In a networked environment, program modules depicted relative to the provisioning computing device 110, or portions or peripherals thereof, may be stored in the memory of one or more other computing devices that are communicatively coupled to the provisioning computing device 110 through the general network connection 151. For example, an authorization computing device, such as that described in more detail below, can act as a host for some or all of the computer-executable instructions whose actions are described below. It will be appreciated that the network connections shown are exemplary and other means of establishing a communications link between computing devices may be used.

Of relevance to the descriptions below, the provisioning computing device 110 can be communicationally coupled to a access control device, such as the access control device 170 shown in FIG. 1. The access control device 170 can be directly communicationally coupled to the provisioning computing device 110, including through a wired or wireless connection, or the access control device can be indirectly communicationally coupled to the provisioning computing device through a storage device with which the access control device is directly communicationally coupled. In the system 100 of FIG. 1, the access control device 170 is shown directly communicationally coupled to the provisioning computing device 110, such as through the non-volatile memory interface 140. The dashed line of FIG. 1 indicates that the access control device 170 can be removably communicationally coupled to the provisioning computing device 110. In one embodiment, for manufacturing efficiency, the access control device 170 can conform to standard memory card specifications and, as such, can be communicationally coupled to the provisioning computing device 110 in the same manner as any other such memory card conforming to the same specifications, such as, for example, through an internal memory card reader or an external memory card reader peripheral communicationally connected to the provisioning computing device.

The access control device 170 can comprise one or more processing units 171, which can include controllers or other components that are capable of adjusting their output based on a collection of inputs. As will be described further below, the processing unit 171 of the access control device 170 can be utilized to perform actions relevant to determining whether or not to allow and enable an associated storage device to provide data to, or store data from, an accessing computing device to which the storage device is communicationally connected.

In performing actions relevant to such gate-keeping, the processing unit 171 of the access control device 170 can utilize access control information 176 that can be provided by the provisioning computing device 110, as shown in the system 100. In one embodiment, the access control information 176 can comprise a listing of entities that can be allowed to access data that was encrypted with the cryptographic information of the access control device 170 and, consequently, when the access control device determines that such an entity is requesting access, the access control device can enable an associated storage device to allow the requesting entity access. For example, the access control information 176 can comprise a listing of identifiers, such as Media Access Control (MAC) addresses, World Wide Names (WWNs), or other unique device or entity identifiers. The access control information 176 can, also comprise passwords of entities, so that the entities can be required to prove their identity to the access control device 170 by providing their passwords before the access control device releases the cryptographic information. Other cryptographic mechanisms, including others based on a similar challenge/response template can likewise be utilized to provide for the authentication, to the access control device 170, of those entities seeking to access data stored by a storage device to which the access control device 170 is communicationally coupled.

In one embodiment, the access control device 170, can further comprise storage-related cryptographic information 175 that can be utilized by a storage device to encrypt data to be stored on the storage media of such a storage device, and decrypt encrypted data already stored on the storage media. With such, the access control device 170 can utilize the storage-related cryptographic information 175 to control access to the data of the storage device by not providing the cryptographic information to the storage device until the access control device has determined that the entity requesting access to the storage device and its data is one of the entities indicated to be allowed access by the access control information 176. Embodiments where the access control information 176 comprises lists of acceptable entities, or lists of entities to whom access is to be denied can be especially useful within a home or small business setting, where the entities that can access data are limited and relatively static.

In an alternative embodiment, however, a computing device external to the access control device 170, such as an authorization computing device, can be referenced by the access control device when determining whether or not to allow access to a storage device to which the access control device is communicationally coupled. In such an embodiment, the access control device 170 can rely on the authorization computing device to instruct it when it should, or should not, allow access. As will be recognized by those skilled in the art, such an embodiment can be useful within enterprise settings, where the entities that can be allowed to access certain data, can often change. In addition, as will be described further below, an embodiment where the access control device 170 references another computing device can be integrated with existing access control technologies typically implemented by an enterprise.

In the embodiment described above, the access control information 176 provided to the access control device 170 by the provisioning computing device 110 can comprise information regarding the establishment of secure communications with the authorization computing device. For example, the access control information 176 could comprise cryptographic information, such as the public access control of the authorization computing device, or other such information from which the access control device 170 can negotiate a shared secret or other such cryptographic tool with which to provide secure communications with the authorization computing device. The access control information 176 could also comprise an identification of the authorization computing device, such as a Domain Name Server (DNS) name of the authorization computing device, or its network address. In an alternative embodiment, described further below, such identifying information can, instead, be provided to the computing device seeking to access data on a storage device to which the access control device 170 is communicationally coupled.

As shown in the system 100, in one embodiment, the operating system 134 of the provisioning computing device 110 can utilize the storage device driver stack 138 to communicate with the access control device 170. More specifically, as indicated, the storage device driver stack 138 can invoke, or otherwise load, the access control device extension 139 when the storage device driver stack detects the presence of the access control device 170. The access control device extension 139 can then handle communications with the access control device 170, including the provision of the access control information 176. In one embodiment, as shown, one or more programs, such as security-related programs, that can be part of the program modules 135, can provide, to the access control device extension 139, and, from there, to the access control device 170, the access control information 176, which, as indicated above, can comprise a listing of entities for which access is to be granted or which, as also indicated above, can comprise information, including cryptographic information, for establishing and maintaining a secure communicational connection to an authorization computing device external to the access control device 170.

The provisioning computing device 110, such as through the access control device extension 139, can provision the access control device 170 with access control information 176 and also optionally provision the access control device with storage-related cryptographic information 175. The storage-related cryptographic information 175, and associated communications are shown in the system 100 with dashed lines to indicate that they are optional. Should the access control device 170 be communicationally disconnected from a storage device, the absence of the storage-related cryptographic information 175 can render the encrypted data stored on the storage media of such a storage device inaccessible. Consequently, the communicational disconnection of a access control device 170 from such a storage device can provide an additional layer of protection should the storage device be physically lost or stolen, and it can also act as evidence of a cryptographic erasure or destruction of the encrypted data stored on the storage media of such a storage device.

In one embodiment, the storage-related cryptographic information 175 can comprise a "physical access control", which can be a series of bits that can be utilized as a access control for encryption and decryption operations in manners well known to those skilled in the art. The term "physical access control", therefore, as utilized in the descriptions below, is intended to refer to a collection of data utilized as a cryptographic access control that is provided from, and is stored on, a physically removable source, such as the access control device 170. Such a physical access control, is meant to be in contrast to a "logical access control", which is not physically separable from the media on which the data encrypted with such a access control is stored.

The storage-related cryptographic information 175 optionally provisioned to the access control device 170 by the provisioning computing device 110 can be provided by any one of multiple sub-systems of the provisioning computing device, through the access control device extension 139. For example, in addition to utilizing a logical access control, the full volume encryption service 137 can leverage its existing functionality to generate a physical access control and provide it to the access control device 170 as at least part of the storage-related cryptographic information 175. Alternatively, a physical access control, or other storage-related cryptographic information 175, can be generated by dedicated hardware, such as hardware that can be present in a storage host controller 145 or other storage interface. As yet another alternative, storage-related cryptographic information 175 can be provided to the access control device 170 from the BIOS 133.

To maintain the security and secrecy of the optional storage-related cryptographic information 175 provided to the access control device 170, such information can be provided by the provisioning computing device 110 in a manner that minimizes the potential for such information to be obtained by adversarial parties, such as through malicious computer-executable instructions executing on the provisioning computing device 110. Therefore, in one embodiment, storage-related cryptographic information 175 provided to the access control device 170, can be provided prior to the completion of the booting of the provisioning computing device 110, and the provided information can be deleted from the provisioning computing device also prior to the completion of the booting of the provisioning computing device. Because malicious computer-executable instructions typically cannot operate prior to the completion of the booting of the host computing device, by providing, and then discarding, the storage-related cryptographic information 175 to the access control device 170 prior to the completion of the booting of the provisioning computing device 110, the provided information can be protected from any malicious computer-executable instructions that may subsequently execute on the provisioning computing device.

For example, the BIOS 133 can detect the presence of the access control device 170 communicationally connected to an interface of the provisioning computing device 110, and can provide the storage-related cryptographic information 175 to the access control device 170 prior to initiating any other processing on the provisioning computing device, including, for example, the initiating of the execution of the operating system 134. Similarly, the storage host controller 145 can detect the presence of the access control device 170 when the controller is first initialized and prior to, at least the completion, if not the commencement of, the booting of the operating system 134. The controller 145 can then, likewise, provide the storage-related cryptographic information 175 to the access control device 170, and can discard it, before any malicious computer-executable instructions can execute on the provisioning computing device 110. As another alternative, the full volume encryption service 137, since it likely already comprises mechanisms that are designed to protect its logical access controls from malicious computer-executable instructions executing on the provisioning computing device 110, can utilize those mechanisms to securely provision the access control device 170 with the storage-related cryptographic information 175 and then discard it to further reduce the possibility that it will be discovered on the provisioning computing device 110. In such embodiments, at least some of the functionality, described above, with reference to the access control device extension 139 can be implemented outside of the operating system 134, such as by the BIOS 133 or the storage host controller 145.

Once the access control device 170 has been provisioned by the provisioning computing device 110, the access control device 170 can be communicationally and, optionally, physically disconnected from the provisioning computing device 110 and can then be utilized in conjunction with a storage device to enable the storage device to store encrypted data and access encrypted data already stored on the computer-readable media of such a storage device.

Figure 2:
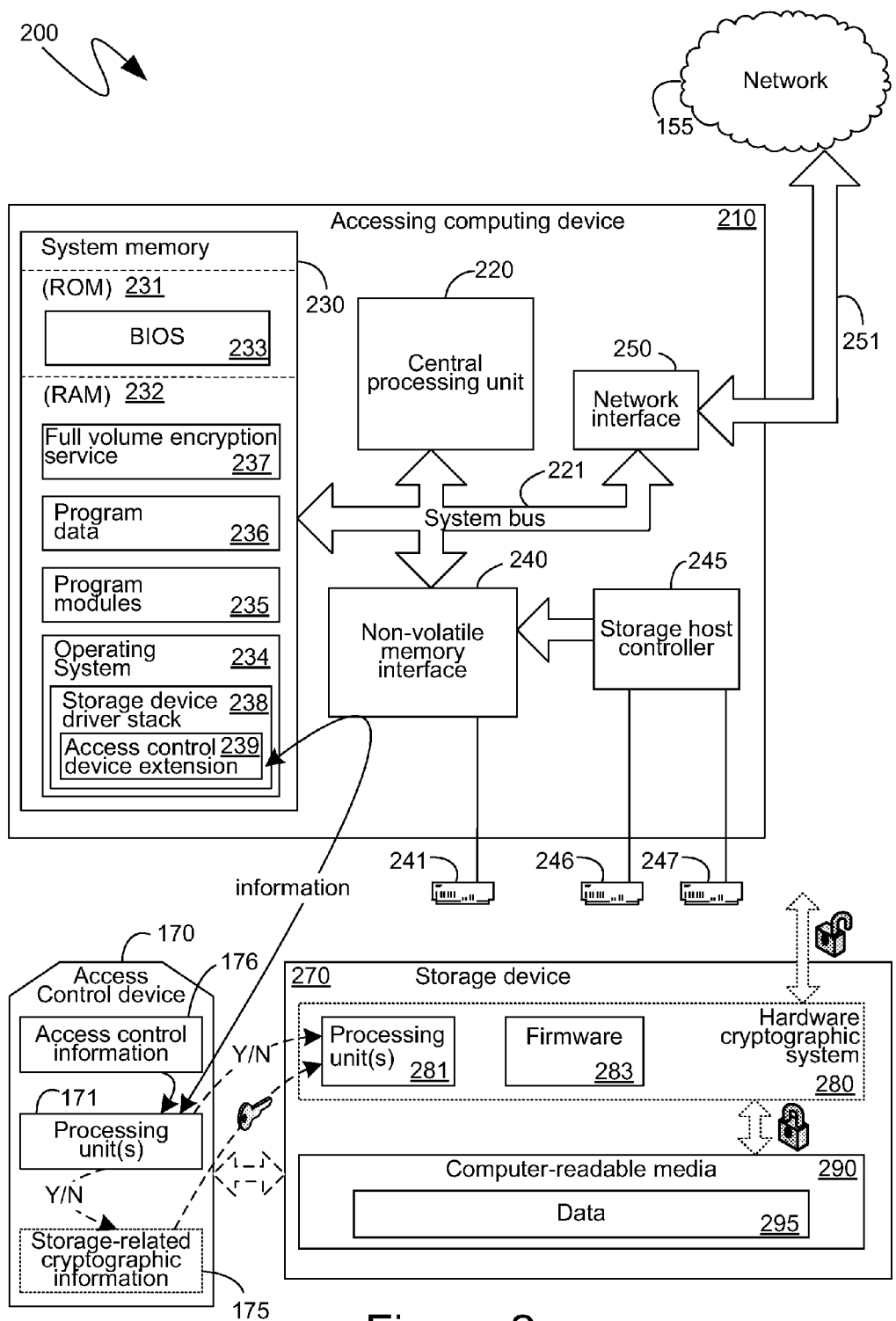
FIG. 2 is a block diagram of an exemplary accessing computing device, an exemplary access control device, and an exemplary storage device.

Turning to FIG. 2, a system 200 is shown comprising an accessing computing device 210, the access control device 170 and an exemplary storage device 270 to which the access control device can be communicationally coupled. As described further below, the communicational coupling between the access control device 170 and the exemplary storage device 270 can be, but does not need to be, a physical coupling. The exemplary storage device 270 can represent any one or more of the storage devices 241, 246 or 247 which are shown as being communicationally coupled to the accessing computing device 210. The accessing computing device 210 can be a different computing device from the provisioning computing device 110, described in detail above, or it can be the same computing device, such as, for example, a computing device utilized by both administrators, that can use it as the provisioning computing device, and users, that can use it as an accessing computing device. For ease of reference and illustration, therefore, the elements of the provisioning computing device 210 are numbered differently from analogous elements of the computing device 110, though their functions may be similar, or even identical. The CPU 220, system bus 221, system memory 230, optional non-volatile memory interface 240 and the storage host controller 245 are all, therefore, similar to the previously described CPU 120, system bus 121, system memory 130, interface 140, and storage host controller 145. Similarly, the ROM 231, with the BIOS 233, and the RAM 232, with the operating system 234, including the storage device driver stack 238 and the access control device extension 239, program modules 235, program data 236 and full volume encryption service 237 are, also, analogous to the above described ROM 131, BIOS 133, RAM 132, operating system 134, storage device driver stack 138, access control device extension 139, program modules 135, program data 136 and full volume encryption service 137. The access control device 170, however, can be the same access control device described in detail above.

Turning to the storage device 270 of the system 200 of FIG. 2, the storage device 270 can be used in the same manner as, and can replace or act as any of the storage devices 141, 146 and 147 described above, whose analogs are illustrated in FIG. 2 as storage devices 241, 246 and 247. Indeed, as indicated by its graphical placement proximate thereto, the storage device 270 is meant to represent, in more detail, any one or more of the storage devices 241, 246 and 247 that are communicationally coupled to the accessing computing device 210.

The storage device 270 can comprise one or more computer-readable media 290, which can comprise non-removable, non-volatile magnetic media, non-removable, non-volatile solid-state based storage media or other removable/non-removable, volatile/nonvolatile computer storage media, including any of those described above. The computer-readable media 290 of the storage device 270 can be utilized by a computing device to store computer readable instructions, data structures, program modules and other data for such a computing device. For example, computer-readable media 290 of the storage device 270 are illustrated as storing data 295, which can be data that, when provided by the storage device 270, is the basis for some or all of the operating system 234, other program modules 235 or program data 236 of the accessing computing device 210.

In addition to the computer-readable media 290, the exemplary storage device 270 can also optionally comprise a hardware cryptographic system 280 that can encrypt data provided to the storage device 270 for storage on the computer-readable media 290 and can decrypt data read from the computer-readable media that will, then, be provided to the accessing computing device 210. As such, the hardware cryptographic system 280 can perform its cryptographic functions without burdening the CPU 220 or other elements of the accessing computing device 210, which can, in one embodiment, treat the storage device 270 in the same manner as any other storage device, without regard to data encryption and decryption. Even further, if the accessing computing device 210 does not comprise relevant cryptographic elements, such as the full volume encryption service 237, the storage-related cryptographic information 175 of an associated access control device 170 can be managed by the hardware cryptographic system 280. The hardware cryptographic system 280 is illustrated in FIG. 2 with dashed lines to indicate that it is an optional component, much like the storage-related cryptographic information 175 of the access control device 170.

However, although the hardware cryptographic system 280 of the storage device 270 can be optional, other components that are shown as sub-components, such as one or more processing units 281 and firmware 283 can be present irrespective of the presence of the hardware cryptographic system. More specifically, in one embodiment, the processing unit 281 and the firmware 283 can provide the storage device 270 with the ability to independently process at least rudimentary instructions, such as, for example, various maintenance and communicational tasks. In another embodiment, however, the processing unit 281 and the firmware 283 can be utilized, at least in part, for performing cryptographic functions, such as the encryption of data provided to the storage device and the decryption of data read from the computer-readable media 290. In such an embodiment, the processing unit 281 and firmware 283 can be considered, at least partially, to be part of the hardware cryptographic system 280. Additionally, as with the processing unit 171 of the access control device 170, the processing unit 281 of the storage device 270 can include controllers or other components that are capable of adjusting their output based on a collection of inputs.

In an embodiment where it is present, the storage-related cryptographic information 175 of the access control device 170 can be referenced by, and can inform the encryption and decryption performed by, the hardware cryptographic system 280 of the storage device 270. In one embodiment, the hardware cryptographic system 280 can perform its cryptographic functions with reference to both the storage-related cryptographic information 175 of the access control device 170, and additional cryptographic information, such as, for example, that provided by the full volume encryption service 237, executing on the accessing computing device 210, or another like cryptographic system.

The access control device 170, which can previously have been provisioned, such as in the manner described in detail above, can be communicationally connected to the storage device 270 as indicated by the dashed bi-directional communicational arrow of FIG. 2. As will be described further below, such a communicational connection between the access control device 170 and the storage device 270 can be wired or wireless, and can be direct or indirect, such as through the accessing computing device 210.

The accessing computing device 210 can attempt to access the data 295 of the storage device 270 by sending appropriate read commands to the storage device. If the access control device 170 has not yet been communicationally connected to the storage device 270, the storage device can, in one embodiment, inform the accessing computing device 210 that it cannot provide access to the data 295. However, in an alternative embodiment, the absence of an access control device 170 can enable the storage device 270 to be utilized in a traditional manner. Should the access control device 170 comprise storage-related cryptographic information 175, then in such an embodiment, if the access control device is not communicationally coupled to the storage device, the storage device can inform the accessing computing device 210 that it cannot access the data 295 (which, in such an embodiment, would be in an encrypted form), since the storage-related cryptographic information 175, which is needed by the hardware cryptographic system 280 of the storage device in order to decrypt the encrypted data, is unavailable. If, on the other hand, the access control device 170 has been communicationally coupled to the storage device 270, the access control device can determine, or receive a determination, regarding whether or not to allow the storage device 270 to provide access to the data 295 to the accessing computing device 210. Such access can be denied through the execution of instructions, such as by the processing unit 281 that are informed by, or invoked by, the access control device 170 and that operate to deny the accessing computing device 210 access to the data 295. Such access can be additionally, or alternatively, denied through the denial of access to the storage-related cryptographic information 175 needed to decrypt encrypted data.

The storage device 270 can notify the accessing computing device of the presence of an access control device 170 that is implementing access control utilizing an appropriate storage-related communicational protocol. As will be described further below, the storage device 270 can return error messages to the accessing computing device 210 in response to its attempts to access the data 295 stored on the storage media 290 of the storage device. Such error messages can indicate, to the accessing computing device 210, the presence of a communicationally coupled access control device 170. In response to such error messages, which can be received by the storage device driver stack 238 that was loaded by the operating system 234 to communicate with the storage device 270, the storage device driver stack 238 can invoke, or otherwise cause to be loaded, the access control device extension 239, which can then enable the accessing computing device 210 to communicate with the access control device 170. The access control device extension 239 can be implemented as a Dynamically Loaded Library module (DLL), pre-loaded routine, or any other run-time bound executable computer code.

In one embodiment, such as that illustrated by the system 200 of FIG. 2, the access control device extension 239 of an accessing computing device 210 can communicate with, and provide information to, the access control device 170 to enable the processing unit 171 of the access control device to make access control decisions based on the access control information 176 with which the access control device was provisioned. For example, the information requested by, and provided to, the access control device 170 can comprise identifying information of the accessing computing device 210 or the storage device 270. Such identifying information can enable the access control device 170 to determine, such as based on the access control information 176, whether the accessing computing device 210 and the storage device 270 are approved entities. In such a manner, access to the data 295 can be limited to only specific accessing computing devices 210, such as those in a secure area, or those without WAN access. As another example, for reliability and performance reasons, manufacturers of controllers, such as the storage host controller 245, analogous to the storage host controller 145 described above, can require that only specific types of storage devices be utilized with their controllers. In such a case, the access control device 170 can be provisioned, in the form of the access control information 176, with one or more identifiers of one or more controllers with which the associated storage device 270 can be allowed to interoperate. Or, alternatively, the access control device 170 can be provisioned with the identifiers of specific storage devices, such as the storage device 270, and specific controllers, such as the storage host controller 245 of the accessing computing device 210, that are allowed to interoperate with one another. Access to the data 295 can be limited in such a manner by verifying that the storage device 270 is communicationally connected to an appropriate accessing computing device 210, even if both the storage device and the accessing computing device are, individually approved entities, as specified by the access control information 176.

In another embodiment, the access control device 170 can comprise multiple sets of storage-related cryptographic information 175, such that individual partitions, or other segmentations of the data 295 within the storage device 270, which can be stored in an encrypted state, can be independently decrypted with reference to the storage-related cryptographic information and access provided thereto. In such an embodiment, the information provided by the accessing computing device can comprise user-identifying information, such as a user name and password, which can be utilized by the processing unit 171 of the access control device 170 to determine if the user has authenticated themselves properly, and is on an approved list, as maintained by the access control information 176. The access control information 176 can specify, for particular users, that the storage-related cryptographic information 175 that can be provided to the storage device 270 only decrypts a portion of the encrypted data, such as can be defined by a pre-formatted partition of the computer-readable media 290, to which the user is authorized to have access. Such an embodiment can be useful for multi-user or time-shared accessing computing devices 210.

As shown in the system 200, the information provided by the accessing computing device 210 can be considered by the processing unit 171 of the access control device 170, in light of the access control information 176 with which the access control device was provisioned by the provisioning computing device 110, and the processing unit of the access control device can, based upon such consideration, determine to allow, or not allow, the storage device 270 to meaningfully respond to data storage related communications from the accessing computing device and, thereby either allow, or not allow the accessing computing device 210 to read the data 295 or write additional data onto the computer-readable media 290. In one embodiment, as indicated above, a determination of whether to allow, or not allow, the storage device 270 to meaningfully respond to data storage related communications can be implemented by the processing unit 171 of the access control device 170 instructing the processing unit 281 of the storage device 270 to execute appropriate instructions from the firmware 283. For example, if the processing unit 171 determined that the accessing computing device 210 should not be allowed to store data on, or read data from, the storage device 270, the processing unit 171 can instruct the processing unit 281 to execute instructions from firmware 283 that notify the accessing computing device 210 that its requests to either write data to the computer-readable media 290 or read the data 295 already stored thereon, are being denied. In addition, instructions executed from the firmware 283 can provide the accessing computing device 210 with an indication of the reason for the denial, such as an appropriate error code. In another embodiment, also indicated above, a determination of whether or not to allow the storage device 270 to meaningfully respond to data storage related communications can be implemented by the processing unit 171 of the access control device 170 releasing, or not releasing, the storage-related cryptographic information 175 to the processing unit 281 of the hardware cryptographic system 280 of the storage device 270, and thereby allowing, or not allowing, the hardware cryptographic system 280 to decrypt the data 295 (stored in an encrypted form) and, thereby, provide access to such data to the accessing computing device 210. Such access control provided by the access control device 170 can be in addition to the access disabling that can be accomplished by communicationally disconnecting the access control device 170, comprising the storage-related cryptographic information 175, from the storage device 270, and thereby communicationally interrupting any ability to provide the necessary storage-related cryptographic information to the storage device to enable the storage device to access encrypted data stored thereon.

Figure 3:
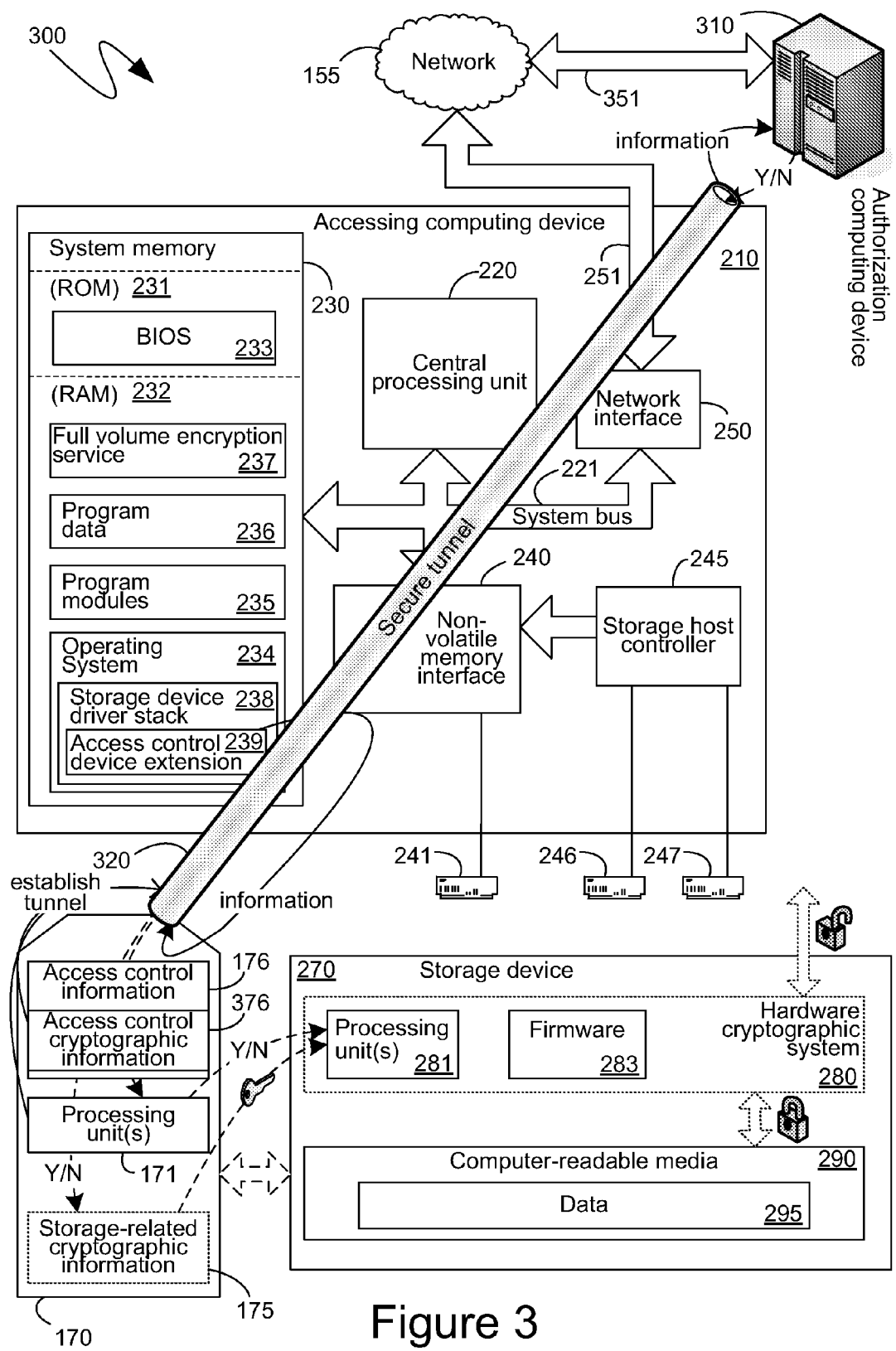
FIG. 3 is another block diagram of an exemplary accessing computing device, an exemplary access control device, and an exemplary storage device.

In another embodiment, such as that illustrated by the system 300 of FIG. 3, the access control device 170 can allow, or not allow the storage device 270 to meaningfully respond to data storage related communications from the accessing computing device 210 based not on its own determinations, such as those informed by access control information 176, but rather based on the determination of an authorization computing device 310 to which the access control device 170 can be communicationally coupled. Turning to FIG. 3, the system 300 is shown comprising the accessing computing device 210, access control device 170 and storage device 270 of the system 200. However, in addition, the system 300 also comprises an authorization computing device 310 that can be communicationally coupled to the accessing computing device 210, such as via the network 155 to which both the accessing computing device and the authorization computing device maintain independent network connections 251 and 351, respectively.

In the embodiment illustrated by system 300, the access control device 170 can have, as part of the access control information 176, access control cryptographic information 376 that can be utilized to establish a secure communicational tunnel 320 to the authorization computing device 310 through the accessing computing device 210. As described previously, when the accessing computing device 210 attempts to access the data 295 stored on the storage device 270, the storage device can inform the accessing computing device of the presence of the access control device 170, which can, in turn, cause the storage device driver stack 238 of the operating system 234 of the accessing computing device to load, or cause to be executed, the access control device extension 239 which can enable communications between the accessing computing device and the access control device. Through those communications, the access control device 170 can request that the access control device extension 239 of the accessing computing device 210 deliver messages from the access control device to the authorization computing device 310 and, conversely, provide, to the access control device, messages from the authorization computing device. In such a manner the access control device 170 can establish the secure communicational tunnel 320 with the authorization computing device 310.

To provide messages from the access control device 170 to the authorization computing device 310, the access control device extension 239 can request that the network interface 250 of the accessing computing device 210 establish a communicational connection to the authorization computing device. In one embodiment, the location of the authorization computing device 310, such as its network address or DNS name, can be provided to the access control device extension 239, and thereby to the network interface 250, from the access control information 176 of the access control device 170. In an alternative embodiment, the location of the authorization computing device 310 can be already known to the accessing computing device 210. For example, typically, when a computing device, such as the accessing computing device 210, establishes the network connection 251 with the network 155, the computing device is provided with certain network information, including, for example, the address of the DNS server and the address of the router serving the computing device. In a like manner, according to the above described embodiment, a computing device, such as the accessing computing device 210, can be provided with the network address, or other location information, for an authorization computing device, such as the authorization computing device 310, that can serve computing devices on the network 155, or on the same portion of the network to which the computing device has connected.

The access control cryptographic information 376 can comprise the public access key of the authorization computing device 310, a shared secret between the authorization computing device and the access control device 170, or any like cryptographic information that can enable the access control device 170 and the authorization computing device 310 to establish the secure communicational tunnel 320, such as through standard tunneling mechanisms, including protocols similar, or identical, to the Point-to-Point Tunneling Protocol (PPTP) or the Level 2 Tunneling Protocol (L2TP). As will be known by those skilled in the art, such tunneling mechanisms can rely on the exchange of various security credentials, such as shared passwords or access controls, or they can rely on security credentials provided by an independent verifier, such as a Kerberos or RADIUS server, any or all of which can have been provided to the access control device 170 as the access control cryptographic information 376. With the secure tunnel 320, despite the fact that messages are relayed by the accessing computing device 210 and are, therefore, visible to components and processes executing on the accessing computing device, such components and process cannot understand the content of such messages and cannot, therefore, cause the access control device 170 to provide the storage-related cryptographic information 175 when the authorization computing device 310 would not otherwise have indicated that such a provision of the storage-related cryptographic information was appropriate. As indicated previously, the access control cryptographic information 376 that can comprise the credentials and other information utilized to establish the secure communicational tunnel 320, can have been provided by the provisioning computing device 110 to the access control device 170 during provisioning.

In one embodiment, the authorization computing device 310 can be integrated with existing access control technologies and methodologies, such as Network Access Protection (NAP), Network Admission Control (NAC), Secure Network Access (SNA) or other like technologies. For example, existing NAP server computing devices can already be aware of a computing device's security as quantified by updated anti-malware software, applied operating system updates, and other like information. Computing devices that may not meet a threshold level of security, as determined by existing NAP server computing devices can, likewise, be identified to the authorization computing device 310 and the authorization computing device can instruct the access control device 170 to not provide the storage-related cryptographic information 175 to storage devices communicationally coupled to such computing devices.

As shown in FIG. 3, therefore, the access control device 170 can still, through communications with the access control device extension 239 of the storage device driver stack 238 executing on the accessing computing device 210, learn of specific information associated with the accessing computing device and the storage device 270 to which the access control device is currently communicationally coupled. Such information, which, as indicated previously, can include identities of the user using the accessing computing device 210, the accessing computing device itself, the storage host controller 245, the storage device 270, and other like information, can be provided, by the access control device 170 to the authorization computing device 310 through the secure tunnel 320. Based on such provided information, and other information that may be available to it, such as the above-described NAP information, the authorization computing device 310 can determine whether to allow the storage device 270 to provide meaningful responses to data storage related communications from the accessing computing device 210. Instructions from the authorization computing device 310 to the access control device 170 can be received through the secure tunnel 320, as shown. In one embodiment, the instructions from the authorization computing device 310 can be received by the processing unit 171 of the access control device 170, and the processing unit can, as described above, instruct the processing unit 281 of the storage device 270 to execute appropriate instructions from the firmware 283 to either meaningfully respond to data storage related communications from the accessing computing device 210, or to respond with an appropriate error or other denial of the storage related communications or requests from the accessing computing device 210. In another embodiment, the instructions from the authorization computing device 310 can be received by the processing unit 171 of the access control device 170, and the processing unit can, as also described above, either provide, or deny, the storage-related cryptographic information 175 to the processing unit 281 of the storage device 270 to enable, or prevent, the storage device 270 from meaningfully responding to data storage related communications from the accessing computing device 210.

In one embodiment, rather than executing on a stand-alone computing device that is apart from the accessing computing device 210, the authorization processes executing on the authorization computing device 310 can, instead, execute within a protected space of the accessing computing device. In such an embodiment the authorization computing device 310 can be a virtual machine or other protected, independent, process executing on the accessing computing device 210. Since, in the above described embodiments, the accessing computing device 210 carried messages to and from the authorization computing device 310, the authorization computing device could, instead, be implemented through the execution of computer-executable instructions on the accessing computing device without changes to the access control device 170.

Figure 4:
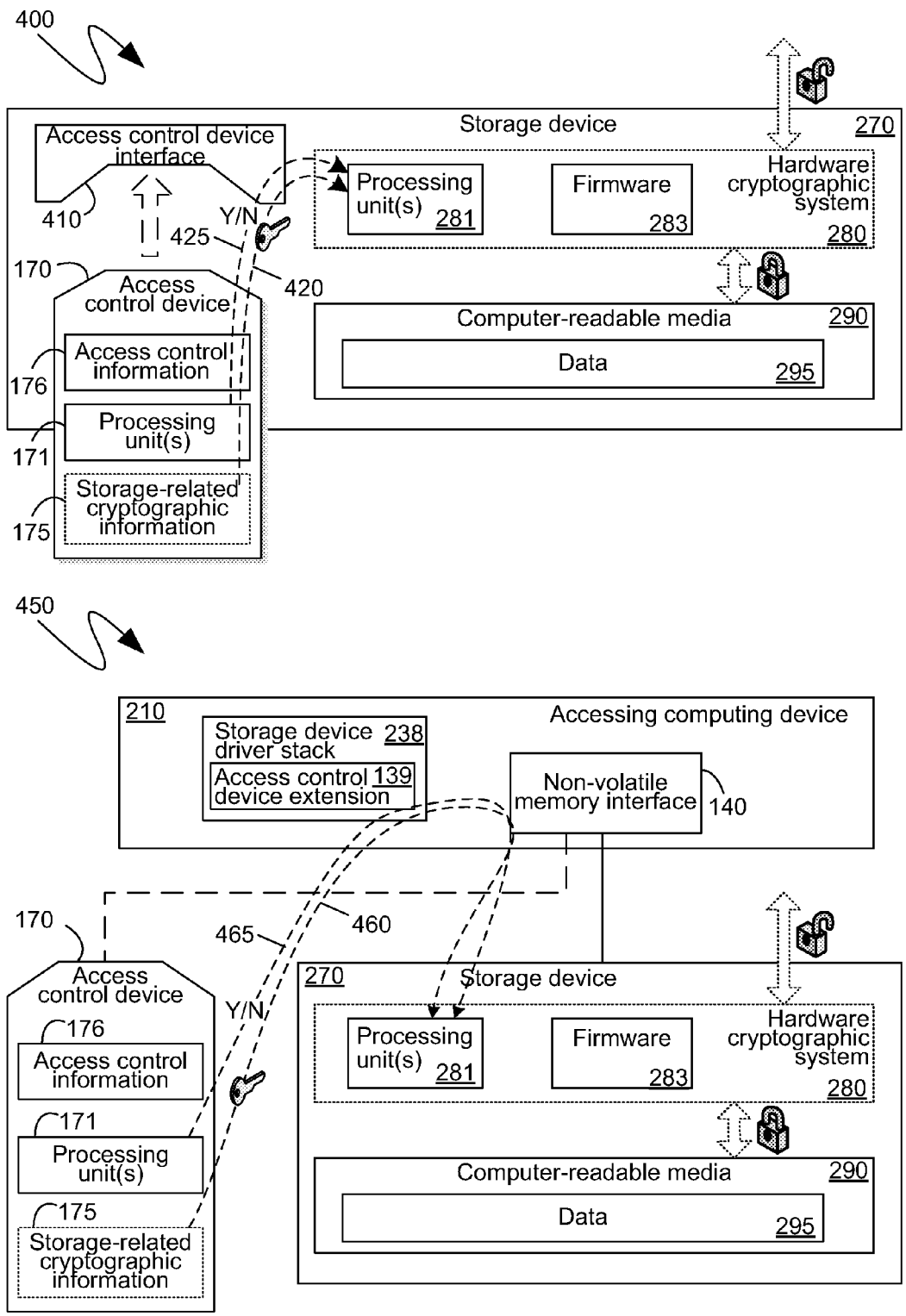
FIG. 4 is a block diagram of exemplary communications between a access control device and a storage device.

Turning to FIG. 4, communicational connections between the access control device 170 and the storage device 270, such as those illustrated in FIGS. 2 and 3 with a dashed communicational arrow, are illustrated and described in greater detail. In one embodiment, as illustrated by the system 400, the storage device 270 can comprise not only the previously described hardware cryptographic system 280 and the computer-readable media 290, but can also comprise a access control device interface 410. The access control device interface 410 can be, by way of example only, a slot or connector on the storage device 270, such that the access control device 170 could be physically inserted into the access control device interface 410, or otherwise connected to it, such that, when inserted or connected, the access control device 170 did not substantially alter the dimensions of the storage device 270. In such a case, the storage device 270 can be utilized by a computing device, such as the accessing computing device 210, described in detail above, as would any other storage device of a similar type without a access control device. For example, if the storage device 270 was designed to conform to a standard hard disk drive size, then the accessing computing device 210 could utilize the storage device 270, with the access control device 170 physically connected thereto, as an internal hard disk drive, and the presence, or absence, of the access control device, would not alter the physical dimensions of the storage device 270 to inhibit such a use.

As another example, the access control device 170 can take the form of a Global System for Mobile (GSM) communications Subscriber Identity Module (SIM) such as is commonly utilized for cellular telephones. In such a case, the access control device interface 410 can be a GSM SIM interface, again as typically included within a cellular telephone. Such an embodiment can offer a cost advantage because both the physical form factor of the access control device 170 and the access control device interface 410 can be commonly utilized and, consequently, inexpensive.

As yet another example, the access control device 170 can comprise a common connector, such as a Universal Serial Bus (USB) connector as can, likewise, the corresponding access control device interface 410. As with the GSM SIM embodiment described above, a USB connector likewise provides cost advantages due to its ubiquity. In such an embodiment, the below described communications between the access control device 170 and the hardware cryptographic system 280 can be performed via the well-known USB communication protocol.

The access control device 170, however, does not necessarily need to be physically connected to the storage device 270 to be communicationally connected to the storage device. The above described embodiment provides for a physical connection between the access control device 170 and the storage device 270 to avoid sending any of the instructions or cryptographic information 175 to the processing unit 281 over the storage device's common type interface. In such a manner, the hardware design of the access control device 170 and the storage device 270 can ensure that the instructions provided by the processing unit 171 or the storage-related cryptographic information 175 cannot be obtained by an external entity.

In an alternative embodiment, the instructions provided by the processing unit 171 to the processing unit 281 and the storage-related cryptographic information 175 can be secured despite the transfer of at least some of them over external communicational interfaces of the storage device 270. Thus, as shown in the system 450, a communicational connection can be established between the access control device 170 and the storage device 270 via the accessing computing device 210, despite a physical separation of the access control device 170 and the storage device 270. As shown, the system 450 can comprise the access computing device 210, the access control device 170 and the storage device 270, with both the access control device and the storage device independently connected to the accessing computing device. Despite the illustration of the system 450, where the access computing device 210, the access control device 170 and the storage device 270 are shown as separate physical entities, no such physical separation is required. For example, the storage device 270 can be connected internally to the accessing computing device 210, such as in the form of an internal hard disk drive. The access control device 170, in turn, can be connected to an external interface of the accessing computing device 210, such as a popular peripheral or storage interface, including both wired and wireless interfaces. In such an embodiment, communications between the access control device 170 and the storage device 270 can be relayed by the storage device driver stack 238 of the accessing computing device 210 which, through its own mechanisms, and through the access control device extension 239, can communicate with both the access control device and the storage device.

Figure 5:
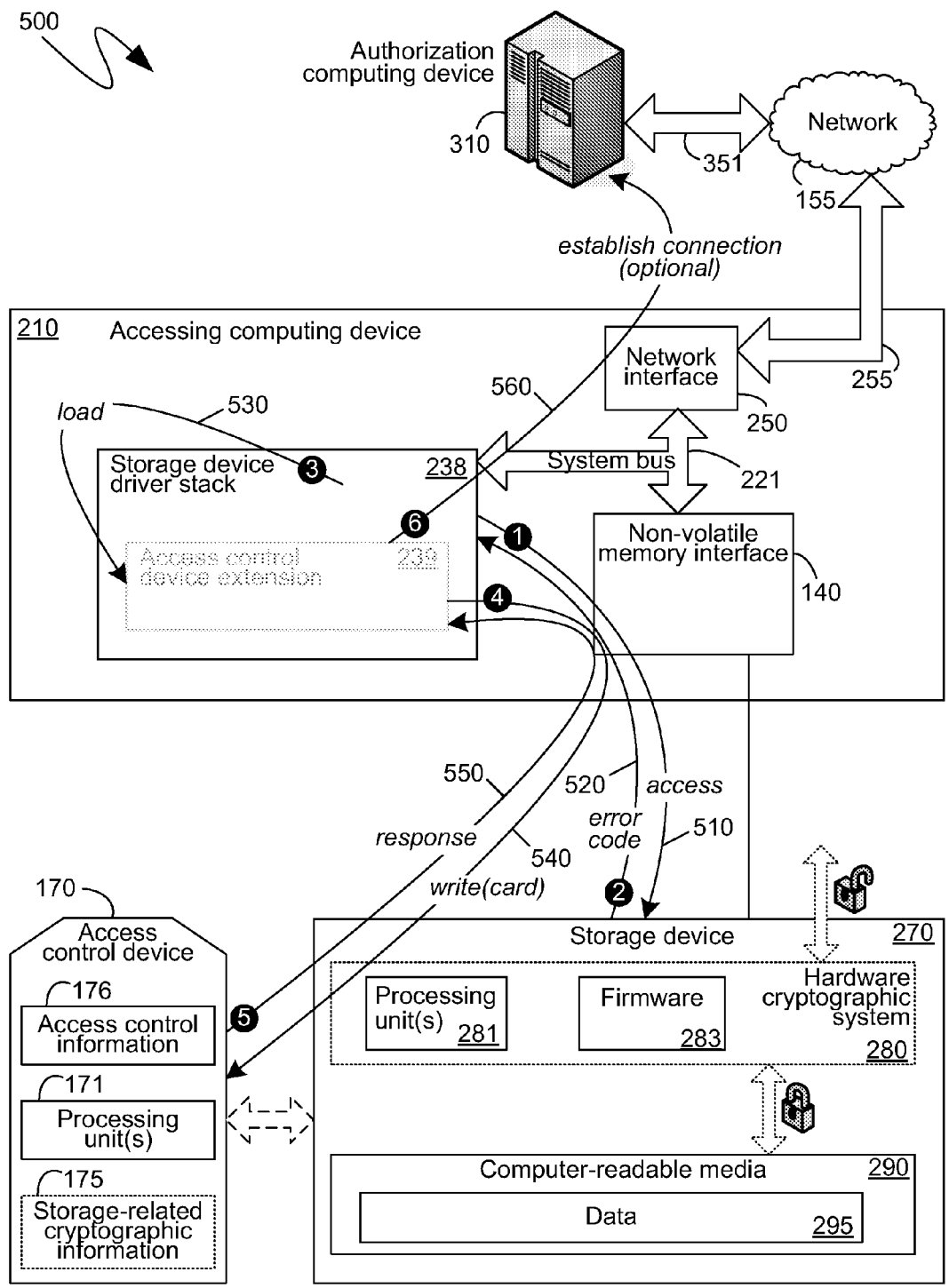
FIG. 5 is a block diagram of additional exemplary communications between a access control device and a storage device.

Turning to FIG. 5, an exemplary communicational exchange between an accessing computing device 210 and the access control device 170 is illustrated with greater specificity with reference to the system 500. As shown in FIG. 5, the system 500 can comprise the same basic components as the systems 200 and 300 described in detail above, including the access control device 170, the storage device 270, the accessing computing device 210, and, optionally, the authorization computing device 310. Initially, as indicated by the communication 510, the accessing computing device 210, and, more specifically, the storage device driver stack 238 of the operating system 234 (not shown) of the accessing computing device, can make a data storage related request of the storage device 270, such as, for example, by issuing a read request, an initialization request, or other like access request. In response to the data storage related request 510, the storage device can provide an error communication 520 comprising an error code. As will be known by those skilled in the art, communications with storage devices, such as those that would be performed by the storage device driver stack 238, can provide for error communications in the form of error codes, where each code is indicative of a particular error, or type of error, on the part of the storage device 270. In one embodiment, an error code can be provided by the storage device 270 to the storage device driver stack 238 as part of the communication 520 that can indicate that the storage device is communicationally coupled to a access control device 170 and that can further indicate that the attempt to access the data 295 has failed because the communicationally coupled access control device has not yet authorized the storage device 270 to meaningfully provide a response to the data storage request 510, such as, for example, by instructing the processing unit 281 to do so, or by providing the storage-related cryptographic information 175 needed to decrypt the requested data.

In response to such an error code, the storage device driver stack 238 can, as indicated by the action 530, load, or cause to be loaded or otherwise executed, the access control device extension 239. As indicated previously, the access control device extension 239 can comprise computer-executable instructions that are configured to communicate with a access control device, such as the access control device 170, including when such a access control device is only indirectly communicationally coupled to a computing device, such as through a storage device. Once the access control device extension 239 is loaded, it can direct communications, such as communication 540, to the access control device 170. In one embodiment, communication 540 can comprise a write command, such as would traditionally be directed to the storage device 270, but the write command can specify an address, or range of addresses, that can indicate to the storage device that the communication is directed to the access control device 170. Thus, as shown in FIG. 5, the communication 540 from the access control device extension 239 can initially be provided to the storage device 270 and, based on the address, or range of addresses, specified, the storage device can then further provide the communication 540 to the access control device 170.

The access control device 170 can provide response communications 550 that can be delivered back to the access control device extension 239 such as by initially being provided by the access control device to the storage device 270 and subsequently from the storage device to the storage device driver stack 238. The storage device driver stack 238 can then, upon receipt of the response 550, recognize it as a response appropriate for the access control device extension 239 and it can direct the access control device extension to the response. As described above, in some embodiments, a response, such as the response 550, can request that the access control device extension 239 forward along certain data that may have been included in the response 550 to the authorization computing device 310. In such a case, the access control device extension 239 can, for example, request that the relevant network processes executing on the accessing computing device 210, together with the network interface 250, establish a communicational connection to the authorization computing device 310 as indicated by the request 560. The access control device extension 239 can, thereby, provide data to and from both the access control device 170 and the authorization computing device 310, thereby enabling the access control device and the authorization computing device to establish the secure communicational tunnel 320.

Figure 6:
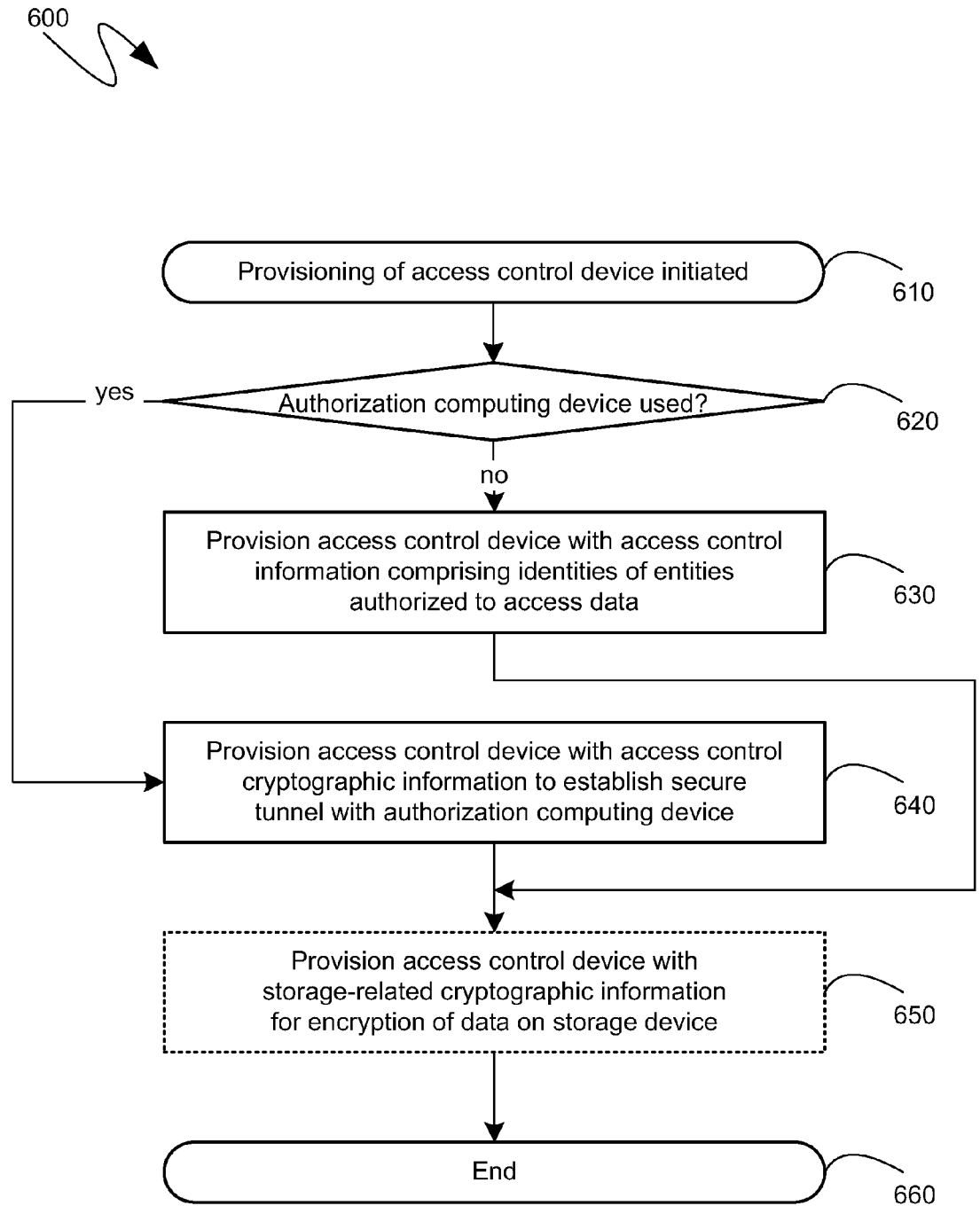
FIG. 6 is a flow diagram of an exemplary operation of an exemplary provisioning computing device.

Turning to FIG. 6, a flow diagram 600 provides a further illustration of an exemplary provisioning of the access control device 170, such as can be performed by the exemplary provisioning computing device 110 illustrated in the system 100 of FIG. 1, and described in detail above. As can be seen from the flow diagram 600, initially, at step 610, provisioning of a access control device, such as the access control device 170, can be initiated. The provisioning initiation of step 610 can be an automated initiation, such as in response to the detection of a access control device being communicationally coupled to a provisioning computing device, or it can be a manually, or user, initiated provisioning, such as through appropriate user interfaces that can be presented by one or more processes executing on a provisioning computing device. Subsequently, at step 620, a determination can be made regarding whether the access control device being provisioned will be utilized in conjunction with an authorization computing device, or whether it will perform access control decisions on a stand-alone basis. If, at step 620, it is determined that the access control device being provisioned will not be used in conjunction with an authorization computing device, then, at step 630, the access control device can be provisioned with access control information that can include identifications of those entities, such as users, computing devices, storage devices, storage host controllers, or combinations thereof, that can be granted access to the data-related capabilities of a storage device with which the access control device is communicationally coupled. Alternatively, if, at step 620, it is determined that the access control device being provisioned will be used in conjunction with an authorization computing device, then, at step 640, the access control device can be provisioned with access control information, including access control cryptographic information, that can enable the access control device to establish a secure communicational tunnel with the authorization computing device through an accessing computing device, such as in the manner described in detail above.

Whether the access control device is provisioned for stand-alone access control operation at step 630, or for interaction with an authorization computing device at step 640, in both cases processing can proceed with an optional step 650, shown as optional via the dashed border, where the access control device can be provisioned with storage-related cryptographic information that can be used, by a storage device with which the access control device is communicationally coupled, to encrypt or decrypt data stored, or to be stored, on the storage device. In one embodiment, the provisioning of storage-related cryptographic information at step 650 can provision the access control device with multiple sets of, for example, physical access controls such that each subsequent storage device that communicates with the access control device can acquire the next physical access control and mark it as in use. In such a manner, a single access control device can be shared by, or utilized in conjunction with, multiple storage devices. Once the storage-related cryptographic information is optionally provisioned to the access control device at step 650, the relevant processing can end at step 660, as shown.

Figure 7:
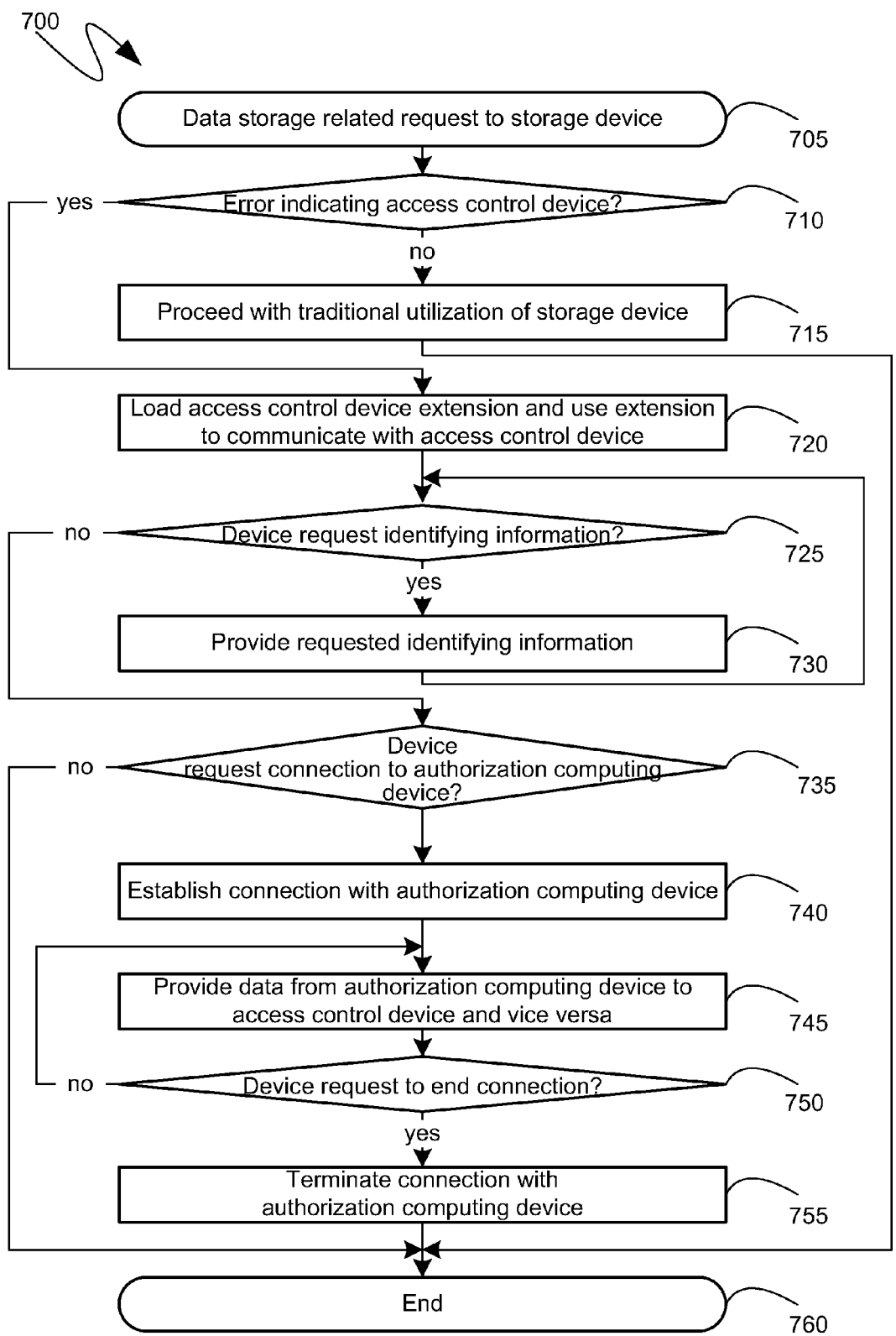
FIG. 7 is a flow diagram of an exemplary operation of an exemplary accessing computing device.

Turning to FIG. 7, a flow diagram 700 is shown, further illustrating an exemplary operation of an accessing computing device, such as the exemplary accessing computing device 210, described in detail above. Turning to the flow diagram 700, initially, as shown, at step 705, the accessing computing device can issue a data storage related request, such as an access request, to a storage device to which the accessing computing device is communicationally coupled. In response to such data storage related request at step 705, the accessing computing device can, at step 710, receive an error indicating that the storage device that is being accessed is communicationally coupled to a access control device. If such an error is not received at step 710, then the accessing computing device can, at step 715, proceed to utilize the storage device in a traditional manner. Relevant processing can then end at step 760.

If, at step 710, the accessing computing device receives an error from the storage device indicating that the storage device is communicationally coupled to a access control device, the accessing computing device can, at step 720, load a access control device extension and, as described previously, utilize the access control device extension to communicate with the access control device. At step 725, a determination can be made as to whether the access control device is requesting information. If the access control device is requesting information, then at step 730, the requested information can be provided. As described previously, such requested information can include the identity of the accessing computing device, the user using such a computing device, the identity of a storage host controller accessing the storage device, and the identity of the storage device itself. As also described previously, such identities can be authenticated, such as through passwords or other security mechanisms, and, in such a case, the requested information provided at step 730 can include those passwords or other responses to a challenge that can have been provided by the access control device at step 725. Once the requested information has been provided at step 730, processing can return to step 725 to await further information requests from the access control device.

If, at step 725, the access control device does not request any information, processing can proceed to step 735 and can determine whether the access control device has requested a connection to an authorization computing device. If, at step 735, such a connection was not requested, then, relevant processing can end at step 760. However, if, at step 735, such a connection was requested, then, at step 740, the requesting computing device can establish a connection with the authorization computing device, such as in the manner described in detail above. Subsequently, at step 745, data exchanges between the access control device and the authorization computing device can be facilitated by the accessing computing device, as also described above.

At step 750, a check can be made to determine if the access control device has requested to end the connection to the authorization computing device. If no such request has been made, then processing can return to step 745 and can continue to exchange data between the access control device and the authorization computing device. If, however, at step 750, the access control device requests that the connection to the authorization computing device be ended, then, at step 755, the connection can be ended and relevant processing can end at step 760.

As can be seen from the above descriptions, a access control device that can control access to a storage device has been provided. In view of the many possible variations of the subject matter described herein, we claim as our invention all such embodiments as may come within the scope of the following claims and equivalents thereto.

We claim:

1. An access control device comprising:
   at least one communicational interface through which communications with a storage device comprising encrypted data are established;
   at least one processing unit;
   access control information comprising identifications of entities that are to be allowed by the access control device to access, in an unencrypted form, the encrypted data stored on the storage device;
   storage-related cryptographic information that can decrypt the encrypted data of the storage device with which communications are established through the at least one communicational interface, wherein the storage-related cryptographic information comprises:
      a first storage-related cryptographic information that can decrypt only a first portion of the encrypted data of the storage device; and
      a second storage-related cryptographic information that can decrypt only a second portion of the encrypted data of the storage device, the second portion being different from the first portion; and
   a computer-readable medium comprising computer-executable instructions that, when executed by the at least one processing unit, cause the at least one processing unit to perform steps comprising:
      receiving an identification of an accessing entity, from a computing device to which the storage device is communicationally coupled, the accessing entity seeking to access, in the unencrypted form, the encrypted data stored on the storage device;
      comparing the received identification of the accessing entity to the access control information;
      providing, in a secured manner, the storage-related cryptographic information to the storage device, thereby enabling the storage device to decrypt the encrypted data, if the comparing reveals that the received identification of the accessing entity matches at least one of the identifications of the entities that comprise the access control information;
   wherein the access control device is physically separable from both the storage device and the computing device; and
   wherein further the computer-executable instructions that cause the provision of the storage related cryptographic information to the storage device comprises computer-executable instructions that, when executed by the at least one processing unit, cause the at least one processing unit to:
      provide, to the storage device, only the first storage-related cryptographic information if the accessing entity is associated with the first storage-related cryptographic information; and provide, to the storage device, only the second storage-related cryptographic information if the accessing entity is associated with the second storage-related cryptographic information.

2. The access control device of claim 1, wherein the access control information further comprises authentication information associated with at least some of the entities that are to be allowed by the access control device to access, in the unencrypted form, the encrypted data stored on the storage device;

and wherein further the computer-readable medium comprises further computer-executable instructions that, when executed by the at least one processing unit, cause the at least one processing unit to perform further steps comprising:

receiving authentication information from the accessing entity; and comparing the received authentication information to the access control information.

3. The access control device of claim 1, wherein the access control information further comprises access control cryptographic information for establishing secure communications with an authorization computing device, external to the access control device, from which the access control device receives updated access control information.

4. The access control device of claim 1, wherein the access control information further comprises access control cryptographic information;

and wherein further the computer-readable medium comprises further computer-executable instructions that, when executed by the at least one processing unit, cause the at least one processing unit to performs further steps comprising:

utilizing the access control cryptographic information to establish a secure communicational tunnel with an authorization computing device through another computing device;

providing, to the authorization computing device, through the secure communicational tunnel, the received identification of the accessing entity; and providing, in the secured manner, the storage-related cryptographic information to the storage device, thereby enabling the storage device to decrypt the encrypted data, if information received from the authorization computing device in response to the providing the received identification of the accessing entity indicates that the accessing entity is to be granted access.

5. The access control device of claim 1, wherein the communicational interface comprises a physical connector that is connectable to a physical receptor that is part of the storage device, such that the established communications with the storage device are direct communications between the storage device and the access control device.

6. The access control device of claim 1, wherein the established communications with the storage device are indirect communications passing through the computing device to which both the access control device and the storage device are independently communicationally coupled.

7. The access control device of claim 6, wherein the computer-executable instructions causing the at least one processing unit to provide the storage-related cryptographic information to the storage device in the secured manner, further comprise computer-executable instructions that, when executed by the at least one processing unit, cause the at least one processing unit to protect the storage-related cryptographic information prior to the providing so as to prevent the storage-related cryptographic information from being deciphered by the computing device.

8. The access control device of claim 1, wherein the computer-readable medium comprises further computer-executable instructions that, when executed by the at least one processing unit, cause the at least one processing unit to erase at least some of the storage-related cryptographic information.

9. The access control device of claim 8, wherein the computer-readable medium comprises further computer-executable instructions that, when executed by the at least one processing unit, cause the at least one processing unit to determine, independently of external instruction, to execute the computer-executable instructions that, when executed by the at least one processing unit, cause the at least one processing unit to erase the at least some of the storage-related cryptographic information.

10. The access control device of claim 8, wherein the computer-readable medium comprises further computer-executable instructions that, when executed by the at least one processing unit, cause the at least one processing unit to perform steps comprising:

receiving an instruction to delete at least some of the encrypted data stored on the storage device; and in response to the receiving, erasing the least some of the storage-related cryptographic information.

11. The access control device of claim 1, wherein the computer-readable medium comprises further computer-executable instructions that, when executed by the at least one processing unit, cause the at least one processing unit to provide, to the computing device, a challenge for authentication information associated with the accessing entity if the identification of the accessing entity is received.

* * * * *